United States Patent [19]
Tanabe

[11] Patent Number: 5,290,622
[45] Date of Patent: Mar. 1, 1994

[54] BOARD STRUCTURE

[75] Inventor: Kazuo Tanabe, Gifu, Japan

[73] Assignee: Ikeda Bussan Co., Ltd., Ayase, Japan

[21] Appl. No.: 789,898

[22] Filed: Nov. 12, 1991

[30] Foreign Application Priority Data

Nov. 30, 1990 [JP] Japan ............... 2-129095[U]

[51] Int. Cl.⁵ .................................. B32B 3/28
[52] U.S. Cl. ........................ 428/182; 428/455; 296/211
[58] Field of Search ............ 428/182, 184, 174, 455, 428/68, 76, 105, 120, 188, 211, 304.4, 402, 532, 533, 537.5, 540; 52/795, 799; 296/210, 211, 214

[56] References Cited

U.S. PATENT DOCUMENTS 3,033,708  5/1962  McKee .................. 428/182

FOREIGN PATENT DOCUMENTS 0576843 11/1943 United Kingdom .

Primary Examiner—Donald J. Loney
Attorney, Agent, or Firm—Foley & Lardner

[57] ABSTRACT

A board structure used for the base material of a molded ceiling member of an automotive vehicle. The board structure includes a corrugated core board formed of a cardboard. Upper and lower surface boards are bonded respectively to the upper and lower surfaces of the corrugated core board. The upper and lower surface boards are formed of cork sheets, respectively, thereby improving the moldability and the physical properties of the board structure.

9 Claims, 2 Drawing Sheets

BOARD STRUCTURE

BACKGROUND OF THE INVENTION

1. Field of the Invention

This invention relates to improvements in a board structure suitable for an interior lining member of an automotive vehicle or the like.

2. Description of the Prior Art

Board structures to be used as an interior lining member of an automotive vehicle are usually arranged as shown in FIG. 5, in which upper and lower surface boards 3A, 3B are fixedly attached respectively to the upper and lower surfaces of a corrugated core board 2. The surface boards 3A, 3B and the corrugated core board 2 are formed of usual cardboard or paper.

However, difficulties have been encountered in such a conventional board structure. The conventional board structure is insufficiently moldable so that cracks and wrinkles are unavoidably formed, particularly at portions subjected to a deep drawing. Additionally, the conventional board structure is insufficiently rigid and, therefore, low in shape-stability after molding. Furthermore, the conventional board structure is insufficiently water resistant.

SUMMARY OF THE INVENTION

An object of the present invention is to provide an improved board structure which can overcome drawbacks encountered in conventional board structures.

Another object of the present invention is to provide an improved board structure which is excellent in moldability, particularly in deep drawing, while being high in rigidity and in water resistance.

A further object of the present invention is to provide an improved board structure which is partly formed of a cork sheet.

A board structure of the present invention is comprised of a corrugated core board. A surface board is fixedly attached to a surface of the corrugated core board. At least one of the corrugated core board and the surface board is formed of a cork sheet.

The cork sheet is light in weight and has a high flexibility while maintaining a suitable rigidity. Furthermore, the cork sheet has excellent resistance to water and has high noise and heat insulation characteristics due to air contained therein.

Accordingly, the board structure using the cork sheet is excellent in moldability particularly in case of a deep drawing, so that cracks and wrinkles are not formed in portions subjected to the deep drawing. Additionally, the board structure is excellent in shape-stability after being molded, and is water resistant. Furthermore, the board structure is light in weight and excellent in noise and heat insulation characteristics and, therefore, very suitable for an automotive interior lining member such as a molded ceiling member.

BRIEF DESCRIPTION OF THE DRAWINGS

In the drawings, like reference numerals designate like elements and parts throughout the figures, in which.

DETAILED DESCRIPTION OF THE INVENTION

Figure 1:
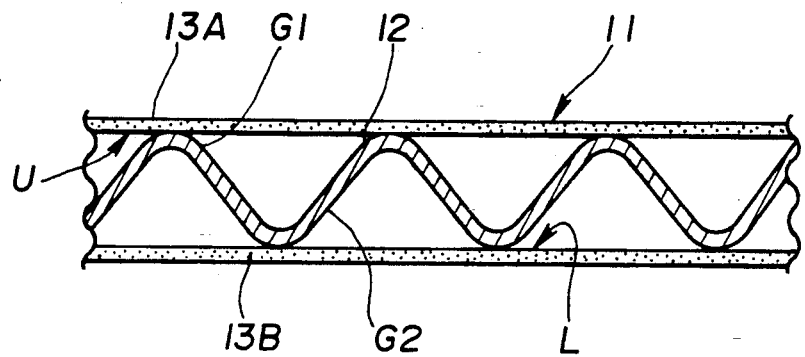
FIG. 1 is a fragmentary vertical sectional view of an embodiment of a board structure in accordance with the present invention.

Referring now to FIG. 1, an embodiment of a board structure is illustrated by the reference numeral 11. The board structure 11 is comprised of a corrugated core board 12 formed of cardboard or paper. The corrugated core board 12 has continuous alternate ridges and grooves, i.e., alternate upwardly-pointing ridges G1 and downwardly-pointing ridges G2. The top surfaces of the adjacent upwardly-pointing ridges G1 form an upper surface U of the corrugated core board 12, whereas the top surfaces of the adjacent downwardly-pointing ridges G2 form a lower surface L of the same board 12.

An upper surface board 13A is fixedly attached to the upper surface U of the corrugated core board 12, i.e., to the top surfaces of the upwardly-pointing rigidies G1 of the corrugated core board 12. The upper surface board 13A is formed of a cork sheet. A lower surface board 13B is fixedly attached to the lower surface L of the corrugated core board 12, i.e., to the top surfaces of the downwardly-pointing ridges G2 of the corrugated core board 12. The lower surface board 13B is also formed of a cork sheet. The cork sheet is produced as follows: First, cork tips are bound to each other by means of synthetic rubber, synthetic resin or the like to form a cork block. Then, the cork block is sliced to obtain the cork sheets.

The thus arranged board structure 11 may be impregnated with a treatment agent or impregnant such as phenolic resin, melamine resin, urea resin, urethane resin, epoxy resin, acrylic resin, silicone resin, polyethylene, polypropylene, urethane prepolymer, epoxy prepolymer, acrylic prepolymer, polyatomic cyanate, acrylic monomer, paraffin, silicone, or the like. In order to impregnate the board structure 11 with the treatment agent, after the board structure 11 is completely constructed, it is dipped in a solution of the treatment agent or coated with the solution of the treatment agent. Otherwise, before construction of the board structure 11, the corrugated core board 12 and/or the upper and lower surface boards 13A, 13B may be dipped in or coated with the solution of the treatment agent.

Figure 2:
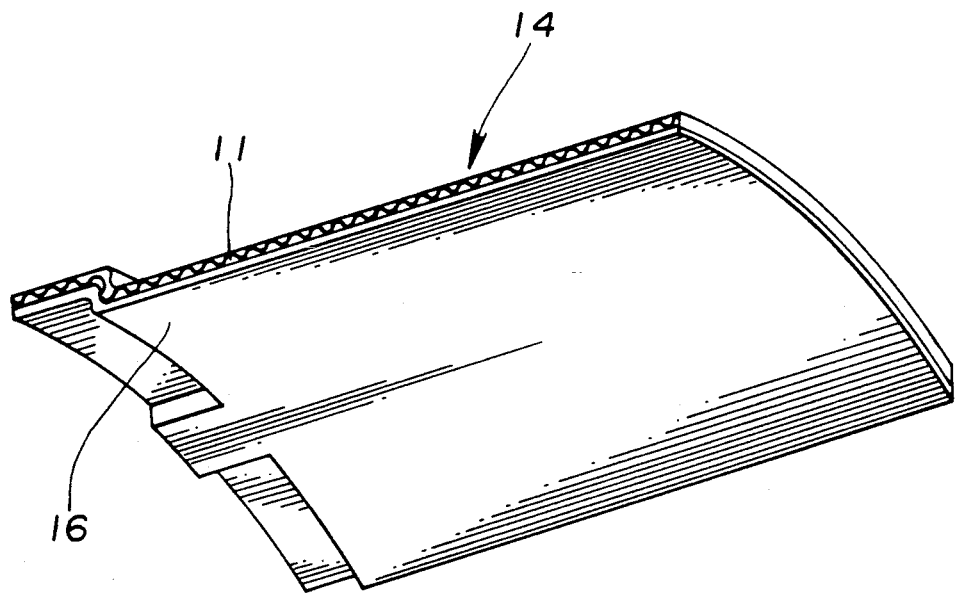
FIG. 2 is a perspective view of a molded ceiling member including the board structure of FIG. 1.

The thus formed board structure 11 is used, for example, as a base material of a molded ceiling member 14 of an automotive vehicle as shown in FIG. 2. In this molded ceiling member 14, a decorative surface mounting material 16 is fixedly attached to the surface of the lower surface board 13B of the board structure 11 as the base material. The surface mounting material 16 is formed of a nonwoven fabric cloth, a woven cloth, a laminated sheet of a polyvinyl chloride synthetic leather and a polyurethane foam sheet, or the like. The surface mounting material 16 is bonded to the lower surface board 13B with a so-called hot melt adhesive or a usual adhesive before or after construction of the board structure 11. It will be understood that the molded ceiling member 14 has been formed by molding a combined board arrangement of the board structure 11 and the surface mounting material 16, for example, by pressing. The molded ceiling member 14 is mounted or attached to the inside surface of a roof (not shown) of the vehicle body so as to serve as a ceiling.

Figure 3:
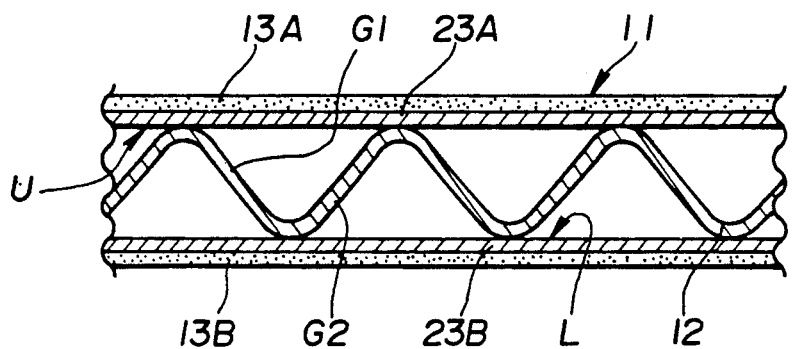
FIG. 3 is a fragmentary vertical sectional view similar to FIG. 1 but showing another embodiment of the board structure in accordance with the present invention.

FIG. 3 illustrates another embodiment of the board structure 11 according to the present invention, which is similar to that of FIG. 1. In this embodiment, an upper intermediate board or cardboard 23A is fixedly interposed between the upper surface U of the corrugated core board 12 and the upper surface board 13A. A lower intermediate board or cardboard 23B is fixedly interposed between the lower surface L of the corrugated core board 12 and the lower surface board 13B. In this embodiment, one of the upper and lower surface boards 13A, 13B of the cork sheet may be omitted, wherein the intermediate board 23A, 23B may be being fixedly attached to the upper or lower surface of the corrugated core board 12.

Figure 4:
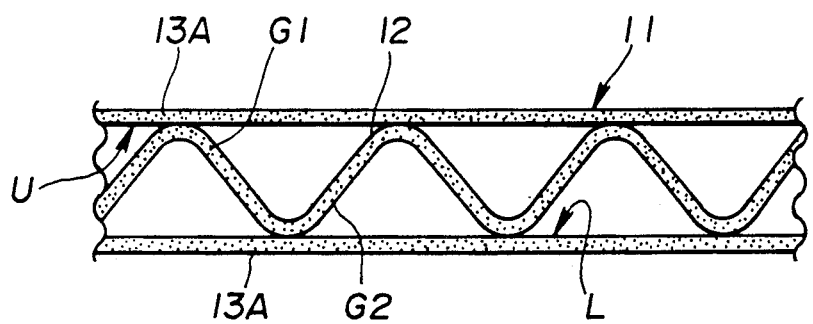
FIG. 4 is a fragmentary vertical sectional view similar to FIG. 1 but showing a further embodiment of the board structure in accordance with the present invention.
Figure 5:
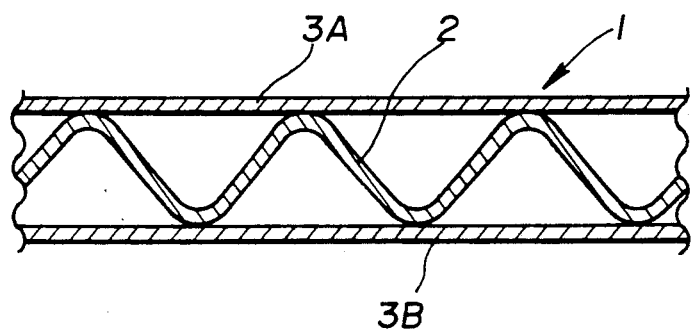
FIG. 5 is a fragmentary vertical sectional view of a conventional board structure.

FIG. 4 illustrates a further embodiment of the board structure 11 according to the present invention, similar to that of FIG. 1 with the exception that the corrugated core board 12 is also formed of a cork sheet. In other words, all the constituent parts of the board structure 11 are formed of cork sheets, respectively.

As is apparent from the above, according to the above embodiments, the board structure using the cork sheet is excellent in moldability, particularly in the case of a deep drawing, so that cracks and wrinkles are not formed in portions subjected to the deep drawing. Additionally, the board structure is excellent in shape-stability after being molded, and in water resistance. Furthermore, the board structure is light in weight and excellent in noise and heat insulation characteristics and, therefore, very suitable for an automotive interior lining member such as a molded ceiling member. It will be understood that such advantages of the board structure depend on the characteristics of the cork sheet. In other words, the cork sheet is light in weight and has a high flexibility while maintaining a suitable rigidity. Furthermore, the cork sheet is excellent in water resistance and has high noise and heat insulation characteristics due to air contained therein.

What is claimed is:

1. A board structure for a base material of a molded ceiling member of an automotive vehicle, said board structure comprising:
   a corrugated core board formed of a material selected from the group consisting of cardboard and cork sheet; and
   a first surface board fixedly attached to a first surface of said corrugated core board, said first surface board being formed of cork sheet.

2. A board structure as claimed in claim 1, further comprising a second surface board fixedly attached to a second surface of said corrugated core board, said second surface being opposite to said first surface.

3. A board structure as claimed in claim 2, wherein said corrugated core board is formed of a cardboard, and said first and second surface boards are formed of cork sheets, respectively.

4. A board structure as claimed in claim 3, further comprising a first intermediate board fixedly interposed between the first surface of said corrugated core board and said first surface board, and a second intermediate board fixedly interposed between the second surface of said corrugated core board and said second surface board.

5. A board structure as claimed in claim 4, wherein said first and second intermediate boards are formed of cardboards, respectively.

6. A board structure as claimed in claim 2, wherein said corrugated core board, said first surface board and said second surface board are formed of cork sheets, respectively.

7. A board structure as claimed in claim 2, wherein said corrugated core board has alternate upwardly-pointing ridges and downwardly-pointing ridges, said first surface being defined by top surfaces of said upwardly-pointing ridges, said second surface being defined by top surfaces of said downwardly-pointing ridges.

8. A board structure as claimed in claim 1, wherein at least one of said corrugated core board and said first surface board is impregnated with a substance for improving a physical property of said boards.

9. A board structure as claimed in claim 8, wherein said substance is at least one selected from the group consisting of phenolic resin, melamine resin, urea resin, urethane resin, epoxy resin, acrylic resin, silicone resin, polyethylene resin, polypropylene, urethane prepolymer, epoxy prepolymer, acrylic prepolymer, polyatomic cyanate, acrylic monomer, paraffin, and silicone.

* * * * *